United States Patent [19]

Dahn et al.

[11] Patent Number: 5,631,106
[45] Date of Patent: May 20, 1997

[54] ELECTRODES FOR LITHIUM ION BATTERIES USING POLYSILAZANES CERAMIC WITH LITHIUM

[75] Inventors: Jeffery R. Dahn, Surrey; Alf M. Wilson, Vancouver; Weibing Xing, Burnaby, all of Canada; Gregg A. Zank, Midland, Mich.

[73] Assignee: Dow Corning Corporation, Midland, Mich.

[21] Appl. No.: 661,533

[22] Filed: Jun. 11, 1996

[51] Int. Cl.$^6$ .................................................. H01M 4/02
[52] U.S. Cl. ........................... 429/218; 429/213; 423/594
[58] Field of Search .............................. 429/218, 213; 423/594

[56] References Cited

U.S. PATENT DOCUMENTS 5,139,901  8/1992  Kawaguchi et al. .................... 429/218

FOREIGN PATENT DOCUMENTS

| | | |
|---|---|---|
| 582173 | 2/1994 | European Pat. Off. . |
| 0685896 | 4/1995 | European Pat. Off. . |
| 0692833 | 6/1995 | European Pat. Off. . |
| 685896 | 12/1995 | European Pat. Off. . |

OTHER PUBLICATIONS

Solid State Ionics, "Lithium insertion in pyrolyzed siloxane polymers" Wilson et al, 74(1994) 249–254 (month N/A).

J. Electrochem, "Dramatic Effect of Oxidation on Lithium Insertion in Carbons Made from Epoxy Resins" Xue et al, vol. 142, No. 11 Nov., 1995, pp. 3668–3677.

J. Electrochem, "An Epoxy–Silane Approach to Prepare Anode Materials for Rechargeable Lithium Ion Batteries" Xue et al, vol. 142 No. 9 Sep. 1995 pp. 2927–2935.

Dahn et al.; Science, 270, 590–593 (1995) (month N/A).

Zheng et al., Chemistry of Materials, 8,389–393 (1996) (month N/A).

Xue et al.; J. of Electrochem. Soc., 142, 3668 (1995) (month N/A).

Wilson et al.; Solid State Ionics, 74, 249–254 (1994) (month N/A).

Wilson et al.; J. of Electrochem. Soc., 142,326–332 (1995) (month N/A).

Xue et al.; J. of Electrochem. Soc., 142, 2927 (1995) (month N/A).

*Primary Examiner*—M. Nuzzolillo
*Attorney, Agent, or Firm*—Roger E. Gobrogge; Sharon K. Severance

[57]  ABSTRACT

A lithium ion battery electrode formed by the pyrolysis of a silazane polymer followed by introducing lithium ions. These electrodes can be used to form batteries with large capacities, low irreversible capacity, high density and good safety behavior.

19 Claims, No Drawings

ELECTRODES FOR LITHIUM ION BATTERIES USING POLYSILAZANES CERAMIC WITH LITHIUM

BACKGROUND OF THE INVENTION

The present invention relates to a method of forming electrodes for rechargeable lithium ion batteries and the electrodes formed thereby. These electrodes can be used to form batteries with high capacities.

Lithium ion batteries are known in the art and are widely used as electric sources for lap top computers, cellular phones, camcorders and the like. They are advantageous in that they can provide high voltage, high energy density, small self-discharge, excellent long-term reliability and the like.

Rechargeable lithium ion batteries have a simple mechanism. During discharge, lithium ions are extracted from the anode and inserted into the cathode. On recharge, the reverse process occurs. The electrodes used in these batteries are very important and can have dramatic effects on the batteries' performance.

Positive electrodes known in the art for use in these rechargeable lithium ion batteries include metal chalcogenides, metal oxides, conductive polymers and the like. Negative electrodes (anodes) known in the art for use in rechargeable lithium ion batteries include compounds in which the lithium ion is incorporated into a crystal structure of inorganic materials such as $WO_2$, $Fe_2O_3$ and the like, and carbonaceous materials such as graphite and conductive polymers.

Properties which are desirable in electrode materials include 1) chemical inertness towards the other battery components such as the lithium ions, the electrolyte salts and the electrolyte medium; 2) the ability to store high quantities of lithium; 3) the ability to reversibly store or bind the lithium; 4) lithium storage that minimizes formation of metallic lithium clusters or agglomerates and, thus, minimizes safety concerns; and 5) a high density which allows for volume efficiency.

The electrodes to date, however, have not maximized these properties. For instance, while lithium metal provides the best electrode potential, large batteries constructed therewith have poor safety behavior. Likewise, while lithium alloys have reasonable electrode potentials and safety profiles, they often crack and fragment with the constant cycling of the battery.

The most desirable anode materials to date have been carbonaceous compounds such as graphite. Graphite is chemically inert, can bind reasonable amounts of lithium (cells with capacities of about 330 mAh/g of anode) with little being irreversible (about 10%), and it has a high density (about 2.2 $g/cc^2$, although in the electrode the density is about 1.2 $g/cc^2$). Cells with larger capacities, however, are often desired. References which discuss the use of graphite anodes include Dahn et al.; Science, 270, 590–3 (1995), Zheng et al., Chemistry of Materials, 8, 389–93 (1996); Xue et al.; J. of Electrochem. Soc., 142, 3668 (1995), Wilson et al.; Solid State Ionics, 74, 249–54 (1994), Wilson et al.; J. of Electrochem. Soc., 142, 326–32 (1995) and Xue et al.; J. of Electrochem. Soc., 142, 2927 (1995).

It has recently been suggested that the addition of boron, phosphorous or metals such as silicon to carbonaceous anodes can increase the capacity of the resultant batteries. Such batteries, however, have not achieved optimal results.

For instance, Tahara et al. in European publication 582,173 teach the use of a silicon oxide or a silicate as the negative electrode in a lithium ion battery. Similarly, Dahn et al. in European publication 685,896 teach the use of SiC containing materials as anodes in lithium ion batteries. These references, however, do not teach the methods or materials claimed herein.

The present inventors have now discovered that lithium ion batteries containing electrodes made from preceramic polysilazanes can have many desirable properties heretofore unobtainable. For instance, such batteries can have large capacities with low irreversible capacity. In addition, these anode materials are chemically inert towards the other battery components, they minimize the agglomeration of lithium and they have a high density. Finally, these materials can be designed to have low hysteresis or a larger hysteresis. The Applicants herein postulate that the hysteresis of these materials may be valuable since it may reduce reaction rates between intercalated lithium and electrolyte under thermal abuse.

SUMMARY OF THE INVENTION

The present invention relates to a method of forming an electrode for a lithium ion battery. The method comprises first pyrolyzing a silazane polymer to form a ceramic material. Lithium ions are then incorporated into the ceramic material to form the electrode. The invention also relates to the electrodes formed thereby.

Detailed Description of the Invention

The present invention is based on the unexpected discovery that lithium ion batteries containing anodes derived from polysilazanes (also referred to as silazane polymers or) can provide the batteries with highly desirable properties. For instance, such batteries can have large capacities (the electrodes have the ability to store large quantities of lithium) with low irreversible capacity (the lithium is reversibly stored). In addition, these anode materials are chemically inert towards the other battery components, they minimize the agglomeration of lithium and they have a high density.

The electrodes of the present invention are formed from silazane polymers. These polymers may contain units of the type $[R^1R^2SiNR^3]$, $[R^1R^2R^3Si\,(NR^4)_{0.5}]$ $[R^1Si(NR^2)_{1.5}]$, and/or

wherein each $R^1$, $R^2$, $R^3$, $R^4$, $R^5$, $R^6$ and $R^7$ is independently selected from the group the group consisting of hydrogen and hydrocarbons having 1–20 carbon atoms. The hydrocarbons include alkyl radicals atoms such as methyl, ethyl, propyl etc., aryl radicals such as phenyl, and unsaturated hydrocarbon radicals such as vinyl. In addition, the above hydrocarbon radicals can contain hetero atoms such as silicon, nitrogen or boron. Examples of specific polysilazane units include $[Ph_2SiNH]$, $[PhSi(NH)_{1.5}]$,

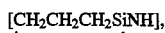

$[MeSi(NH)_{1.5}]$, $[Me_2SiNH]$, $[ViSi(NH)_{1.5}]$, $[Vi_2SiNH]$, $[PhMeSiNH]$, $[HSi(NH)_{1.5}]$, $[PhViSiNH]$, $[MeViSiNH]$, and the like.

The polysilazanes of this invention can be prepared by techniques well known in the art. The actual method used to prepare the polysilazane is not critical. Suitable preceramic silazane polymers or polysilazanes may be prepared by the methods of Gaul in U.S. Pat. Nos. 4,312,970 (issued Jan. 26, 1982), 4,340,619 (issued Jul. 20, 1982), 4,395,460 (issued Jul. 26, 1983), and 4,404,153 (issued Sep. 13, 1983), all of which are hereby incorporated by reference. Suitable polysilazanes also include those prepared by the methods of Haluska in U.S. Pat. No. 4,482,689 (issued Nov. 13, 1984) and Seyferth et al. in U.S. Pat. No. 4,397,828 (issued Aug. 9, 1983), both of which are hereby incorporated by reference. Other polysilazanes suitable for use in this invention can be prepared by the methods of Cannady in U.S. Pat. Nos. 4,540,803 (issued Sep. 10, 1985), 4,543,344 (issued Sep. 24, 1985), Burns et al. in J. Mater. Sci, 22 (1987), pp 2609–2614, and Burns in U.S. Pat. Nos. 4,835,238, 4,774,312, 4,929,742 and 4,916,200, which are all incorporated herein in their entirety.

The polysilazane may also be substituted with various metal groups (i.e., containing repeating metal-N—Si units). Examples of suitable compounds include borosilazanes which are known in the art. These include, but are not limited to, those described in U.S. Pat. No. 4,910,173 granted to Niebylski, those described by Haluska in U.S. Pat. No. 4,482,689, those described by Zank in U.S. Pat. Nos. 5,164,344, 5,252,684 and 5,169,908, those described by Funayama et al., in U.S. Pat. No. 5,030,744, those described by Seyferth et al., J. Am. Ceram. Soc. 73, 2131–2133 (1990), those described by Noth, B. Anorg. Chem. Org. Chem., 16(9), 618–21, (1961), and those described by Araud et al. in European Patent No. 364,323, which are all incorporated herein by reference in their entirety.

It should be noted that the term polysilazanes as used herein is intended to include copolymers or blends of the above polysilazanes and other polymers which are also useful herein. For instance, copolymers of polysilazanes and silalkylenes [$R_2Si(CH_2)nSiR_2O$] (eg., silethylene), silarylenes (eg., silphenylene [$R_2Si(C_6H_4)nSiR_2O$]), siloxanes [$R_2SiO$], silanes [$R_2Si$—$SiR_2$], organic polymers and the like can be used herein. Moreover, blends of polysilazanes and the above mentioned polymers are also useful herein.

Generally, the silazane polymer should be capable of being converted to ceramic materials with a ceramic char yield greater than about 20 weight percent. However, those with higher yields, such as greater than about 30 weight percent, preferably greater than about 50 weight percent and more preferably greater than 70 weight percent, are often used.

The above polymers should generally provide a char with at least an excess of carbon (eg., >0.05 wt. % based on the weight of the char). Although not wishing to be bound by theory, it is thought that the excess carbon forms a continuous network for the lithium ions. Larger excesses of carbon (eg., >5 wt. %) are often preferred.

What is meant by "excess carbon" in this invention is the amount of free or excess carbon derived from the polysilazane (i.e., that not bound to Si, O or N) during pyrolysis expressed as a weight percentage based on the weight of the char.

The amount of free carbon derived from the polysilazane is determined by pyrolysis of the polymer to an elevated temperature under an inert atmosphere until a stable ceramic char is obtained. For purposes of this invention, a "stable ceramic char" is defined as the ceramic char produced at an elevated temperature (e.g., 700°–1200° C.).

Both the ceramic yield and the silicon, oxygen, nitrogen and carbon content of the stable ceramic char are then determined. Using a composition rule of mixtures, the amount of excess carbon in the stable ceramic char can be calculated (the amount of "excess carbon" in the char is calculated by subtracting the theoretical amount of carbon bound to silicon from the total carbon present). The amount of excess carbon thus calculated is normally expressed as a weight percent based on the weight of the char derived from the polysilazane.

If the desired amount of free carbon cannot be incorporated into the polymer, an additional source of carbon may be added. Examples include elemental carbon, phenolic resin, coal tar, high molecular weight aromatic compounds, derivatives of polynuclear aromatic hydrocarbons contained in coal tar and polymers of aromatic hydrocarbons.

Generally, polysilazanes which contain phenyl groups are preferred since they add to the free carbon in the ceramic chars. Polysilazanes which contain vinyl groups are also preferred since vinyl groups attached to silicon provide a mechanism whereby the polymer can be cured prior to pyrolysis. Polysilazanes where R is almost exclusively methyl or hydrogen are generally not suitable for use in this invention without other carbon additives as there is insufficient free carbon in the resulting ceramic char.

The compositions of this invention may also contain curing agents which are used to crosslink the polymer prior to pyrolysis. These curing agents may be activated by heating the green body containing the curing agent to temperatures in the range of 50°–300° C. (i.e., the activation of a free radical precursor) or they may be crosslinked at room temperature. Additionally, conventional condensation type curing and curing agents may also be used herein.

Curing agents are well known in the art. Examples include free radical precursors such as organic peroxides (dibenzoyl peroxide, bis-p-chlorobenzol peroxide, bis-2,4-dichlorobenzol peroxide, di-t-butyl peroxide, dicumyl peroxide, t-butyl perbenzoate, 2,5-bis(t-butylperoxy)-2,3-dimethylhexane and t-butyl peracetate); and platinum-containing curing agents such as platinum metal, $H_2PtCl_6$, and $((C_4H_9)_3P)_2PtCl_2$. Other conventional curing agents known in the art may also be used. The curing agent is present in an effective amount, i.e. an amount sufficient to induce crosslinking in the silazane. Normally, however, the peroxide curing agent will be present at about 0.1 to 5.0 weight percent based on the weight of the compound to be cured with the preferred amount being about 2.0 weight percent. When platinum-containing curing agents are used, the amount will normally be such that platinum is present at about 1 to 1000 ppm based on the weight of the compound to be cured with the preferred amount being about 50 to 150 ppm platinum.

Examples of crosslinking agents include, for example, polyfunctional organosilicon compounds such as silanes, silazanes or siloxanes. The preferred crosslinking agents are organosilicon compounds with Si—H or Si—Vi functional bonds.

The addition of other materials is also within the scope of this invention. For instance, it is within the scope of the invention to add fillers such as amorphous or ceramic powder (eg., colloidal silica, carbon etc.), solvents, surfactants or processing aids such as lubricants, deflocculants and dispersants.

The polysilazane and any optional ingredients are often cured prior to pyrolysis to increase the char yield. Curing procedures are well known in the art. Generally, such curing can be carried out by heating the article to a temperature in the range of about 50° to 450° C., preferably in an inert atmosphere such as argon or nitrogen.

The polysilazane is then pyrolyzed in an inert atmosphere and/or under vacuum to a temperature of 700° C. or more. The preferred pyrolysis temperature is about 800° to 1400° C.

Inert atmospheres are used during pyrolysis to prevent oxygen incorporation into the ceramic, or loss of carbon through combustion. For purposes of this invention, an inert atmosphere is meant to include an inert gas, vacuum or both. If an inert gas is used it may be, for example, argon, helium or nitrogen. If a vacuum is used it may be, for example, in the range of 0.1–200 torr.

If desired, however, a reactive gas such as silane, methane, $H_2$, $O_2$, or $NH_3$ may be used to chemically change the composition of the ceramic from that derived by pyrolysis in an inert atmosphere.

Pyrolysis may be performed in any conventional high temperature furnace equipped with a means to control the furnace atmosphere. Such furnaces are well known in the art and many are commercially available.

The temperature schedule for pyrolysis has been found to be important in the present invention. Generally, heating temperatures should be at a rate less than about 50° C./minute and preferably less than about 10° C./minute.

The resultant ceramics contain silicon, carbon, oxygen, nitrogen and/or hydrogen in a wide array of proportions, based on the composition of the polysilazane. For instance, the material can have a composition of:

$$SiO_xC_yN_z$$

wherein x=0 to 4, y=0 to 1000 and Z=0 to 40. Although unaccounted for in this formula, hydrogen may also be present in small amounts (e.g., <5 wt. %).

Applicants have discovered, however, that ceramic materials of the composition:

$$SiO_xC_yN_z$$

wherein x=0.1 to 2.0, y=0.1 to 100, z=0.1 to 1.5 produce electrodes with the ability to reversibly store high quantities of lithium.

As noted above, when these types of materials are used as electrodes in lithium ion batteries, they provide the batteries with many desirable properties. For instance, such batteries can have large capacities with low irreversible capacity. In addition, these anode materials are chemically inert towards the other battery components, they minimize the agglomeration of lithium and they have a high density. Finally, these materials can be designed to have low hysteresis or a larger hysteresis. The Applicants herein postulate that the hysteresis of these materials may be valuable since it may reduce reaction rates between intercalated lithium and electrolyte under thermal abuse.

It is often preferred to process the ceramic material which results from the above pyrolysis into a powder form for use in the electrodes. This can be accomplished by techniques known in the art such as grinding, milling, spray drying and the like.

Alternatively, however, the polysilazane can be molded into the desired shape before pyrolysis followed by heating to produce the shaped electrode. For instance, the polysilazane can be polymerized to a gel particle and then pyrolyzed.

If a ceramic powder is used, it is often mixed with variety of conductive agents, diluents or binders to assist in forming the desired shape electrode. For instance carbon black conductive diluent, N-methylpyrollidone, cyclohexanone, dibutylpthallate, acetone, or polyvinylidene fluoride binder, polytetrafluorethylene dispersed in water as a binder or ethylene propylene diene terpolymer dissolved in cyclohexanone as a binder are within the scope of the invention.

Finally, lithium ions are incorporated into the electrode. This can occur prior to insertion of the electrode into the battery by, for instance, physically incorporating the lithium in the silazane polymer prior to pyrolysis or by mixing the lithium in the powdered ceramic material.

Preferably, however, the lithium ions are inserted after the electrode is inserted into the battery. At such time, the battery is merely "charged" by placing both the electrode of the invention and a counter electrode of, for instance, lithium transition metal oxide such as $LiCoO_2$ in a litium ion conductive non-aqueous electrolyte and then applying a current in a direction which allows incorporation of the lithium ion into the electrode of the invention.

The electrodes of the present invention can be used in any battery configuration. The preferred battery of the present invention is the conventional spiral wound type in which a cathode and anode separated by a porous sheet are wound into a "jelly roll".

The cathodes typically comprise a suitable cathode material as described in the prior at (eg., as lithiated metal oxides) applied on the surface of aluminum foil. This is often accomplished by forming a slurry of the cathode material and a binder and/or diluent and then depositing the slurry on the foil. The diluent is dried leaving a thin film of the cathode material on the foil.

Anodes are formed in the same manner as the cathode except that the ceramic of the present invention is used as the anode material and a copper foil is used in place of the aluminum foil.

As noted above, a porous sheet such as a polyolefin material is placed between the cathode and the anode and the composition is then rolled. This "jelly roll" is inserted into a conventional battery can and the can is sealed with a header and a gasket.

Before the can is sealed, an appropriate electrolyte is added to fill the pores in the porous sheet and in the electrode themselves and connections are made between the anode and cathode and the external terminals.

Those skilled in the art will understand that the type and amount of the battery components will be chosen based on component material properties and the desired performance and safety requirements of the battery. Also, the battery is generally electrically conditioned (recharged) during its manufacture.

Other configurations or components are possible. For instance, coin cells or a prismatic format are within the scope of the present invention.

The following non-limiting examples are provided so that one skilled in the art will more readily understand the invention.

I. Battery Testing

Laboratory coin cell batteries were used to determine electrochemical characteristics. These were assembled using conventional 2325 hardware and with assembly taking place in an argon filled glovebox. For purposes of analysis the experimental electrode materials were used opposite a lithium metal electrode in these coin cell batteries. A stainless steel cap and a special oxidation resistant case comprise the container and also serve as negative and positive terminals respectively. A gasket is used as a seal and also serves to separate the two terminals. Mechanical pressure is applied to the stack comprising the lithium electrode, separator, and the experimental electrode by means of a mild steel disk spring and a stainless disk. The disk spring was selected such that a pressure of about 15 bar was applied following closure of the battery. A 125 μm thick foil was used as the lithium electrode. Celgard® 2502 microporous polypropylene film was used as the separator. The electrolyte was a solution of 1M LiPF$_6$ salt dissolved in a solvent mixture of ethylene carbonate and diethyl carbonate in a volume ratio of 30/70.

Electrodes of experimental material were made using a mixture of the powdered ceramic material plus Super S (trademark of Ensagri) carbon black conductive diluent and polyvinylidene fluoride (PVDF) binder (in amounts of about 5 and 10% by weight respectively to that of the sample) uniformly coated on a thin copper foil. The powdered sample and the carbon black were initially added to a solution of 20% PVDF in N-methylpyrollidone (NMP) to form a slurry with additional NMP added to reach a smooth viscosity. The slurry was then spread on pieces of copper foil using a small spreader, and the NMP evaporated at about 100° C. in air. Once the sample electrode was dried it was compressed between flat plates at about 25 bar pressure. Electrode squares, 1.44 cm$^2$, were then cut from the larger electrode. These electrodes were then weighed and the weight of the foil, the PVDF, and the carbon black were subtracted to obtain the active electrode mass.

After construction, the coin cell batteries were removed from the glove box, thermostated at 30±1° C., and then charged and discharged using constant current cyclers with a ±1% current stability. Data was logged whenever the cell voltage changed by more than 0.005 V. Currents were adjusted based on the amounts of active material and the desired test conditions. Normally currents of 18.5 mAh/g of active material were used.

Cells were normally discharged to 0.0 V and then charged to 3.0 V. This is the 'first cycle'. The cells were similarly cycled two more times in succession. The capacity of the first discharge is designated $Qd_1$, the capacity of the first charge by $Qc_1$, etc. The reversible capacity is taken here to be $Qrev=(Qc_1+Qd_2)/2$. The irreversible capacity s taken to be $Qirr=Qd_1-Qc_1$.

II. Materials

Lupersol 101™ is 2,5-bis(t-butylperoxy)-2,3-dimethylhexane obtained from PennWalt Corp. and Dicup "R"™ is dicumyl peroxide obtained from PennWalt Corp.

Polymer pyrolysis was carried out in a Lindberg Model 54434 or similar tube furnace equipped with Eurotherm temperature controllers. In a typical pyrolysis a sample was weighed out (approximately 4.0 grams) and placed in an alumina boat and loaded into the furnace. The furnace was then purged with argon at a rate sufficient to achieve one turnover of the furnace atmosphere every 3 minutes. After purging 45 to 60 minutes the flow was reduced to allow for a turnover every 6 minutes and the temperature raised to a final temperature and held 60 minutes. The ceramic sample was then reweighed, and ground for testing and analysis.

III. Analysis

Solution NMR spectra were recorded on a Varian VXR400S or Varian 200 MHz instrument. Gel permeation chromatographic data were obtained on a Waters GPC equipped with a model 600E systems controller, model 410 differential refractometer detector interfaced to a Compaq 486/33 computer employing PE Nelson Turbochrom software; all values are relative to polystyrene standards. Thermal gravimetric analysis were recorded on an Omnitherm TGA 951 analyzer interfaced to an IBM PS/2-50 Z computer with Thermal Sciences software. Carbon, hydrogen and nitrogen analysis were done on a Perkin Elmer 2400 analyzer Oxygen analysis were done on a Leco oxygen analyzer model RO-316 equipped with an Oxygen determinator 316 (Model 783700) and an Electrode furnace EF100. Silicon analysis was determined by a fusion technique which consisted of converting the solid to a soluble form and analyzing the solute for total silicon by Arl 3580 ICP-AES analysis.

The x-ray powder diffraction was carried out on a Siemens D5000 horizontal theta-theta automated goniometer, equipped with a sample spinner, low background sample holders, graphite monochromator, scintillation counter, long fine focus Cu tube, and computer controlled operation. The solid sample is always ground to a fine powder of −100 mesh & smaller without any grit feeling by using a boron carbide grinder to minimize the contamination from grinding. Scans are made at 1 degree 2-theta per minute from 6 to 80 2-theta with the x-ray tube operated at 40 kV & 30 mA.

IV. Example 1

Polymer Synthesis

In a 2 L three necked flask fitted with an overhead stirrer, a water cooled condenser connected to a mineral oil bubbler and an ebbulator tube was placed dichlorosilacyclobutane (28.2 g, 0.2 mole), diphenyldichlorosilane (101.2 g, 0.4 mole) and toluene 1L under argon. This stirred mixture was cooled to −78° C. and NH$_3$ gas added subsurface over a 90 minute period. The gas flow was stopped and the reaction allowed to warm to ambient temperature. The reaction was then filtered to remove the majority of the salts through a sintered glass funnel containing Celatom filter-aid. The filtrate was returned to the reactor and phenyltrichlorosilane (84.5 g, 0.4 mole) added and the reaction heated to reflux for 2 h. After the reflux the reaction was recooled to −78 ° C. and additional NH$_3$ added over another 90 minute period. The excess ammonia was allowed to boil off as described above and the polymer product was isolated by filtration as above and removal of the solvent by rotary evaporation. Yield 125 g.

Curing and Pyrolysis

An aliquot of the polymer material (ca. 40 g) was mixed with 1 wt % Lupersol 101™ and heated to 150°–175° C. for 20 to 45 minutes. An aliquot of the cured polymer (ca. 4 g) was placed in a graphite crucible and heated under a continuous argon purge furnace at 5° C./min to 1000° C. and held at temperature for one hours before cooling to ambient temperature. The ceramic yield was calculated and the sample analyzed as described above. Yield: 59.5%; % C: 50.5; % H: 0.90; % N: 15.41; % Si: 29.4. XRD analysis: a silica glass XRD pattern with broad reflections centered at 24° and 68° 2 theta and a graphene pattern with a broad reflection centered at about 44 degrees 2 theta.

Battery Cell Testing

An aliquot of the ceramic material was made into an electrode as described above and assembled into a test cell as described above. Pyrolysis Rate: 45° C./min.; Reversible Capacity: 521 mAh/g; Irreversible Capacity 517 mAh/g; average charge voltage 0.93 V. Pyrolysis Rate: 5° C./min.; Reversible Capacity: 545 mAh/g; Irreversible Capacity 301 mAh/g; average charge voltage 0.87 V.

Example 2–4

Polymer Synthesis

In a 2 L three necked flask fitted with an overhead stirrer, a water cooled condenser connected to a mineral oil bubbler and an ebbulator tube was placed dichlorosilacyclobutane (28.2 g, 0.2 mole), diphenyldichlorosilane (101.2 g, 0.4 mole) and toluene 1L under argon. This stirred mixture was cooled to −78° C. and NH₃ gas added subsurface over a 90 minute period. The gas flow was stopped and the reaction allowed to warm to ambient temperature. The reaction was then filtered to remove the majority of the salts through a sintered glass funnel containing Celatom filter-aid. The filtrate was returned to the reactor and phenyltrichlorosilane (84.5 g, 0.4 mole) added and the reaction heated to reflux for 2 h. After the reflux, the reaction was recooled to −78° C. and additional NH₃ added over another 90 minute period. The excess ammonia was allowed to boil off as described above and the polymer product was isolated by filtration as above and removal of the solvent by rotary evaporation. Yield 125 g.

The above silazane polymer was then blended with 250 g toluene, pitch and 0.5 g Lupersol 101™ (Example 2=30 g pitch and 30 g silazane; Example 3=15 g pitch and 45 g silazane; Example 4=45 g pitch and 15 g silazane)

Curing and Pyrolysis

An aliquot of a polymer material (ca. 4 g) was placed in a graphite crucible and heated under a continuous argon purge at 5° C./min to 1000° C. and held at temperature for one hour before cooling to ambient temperature. The ceramic yield was calculated and the sample analyzed as described above. The results are summarized in Table 1.

TABLE 1

| Ex | Ceramic Yield | %C | %H | %Si | %N |
|---|---|---|---|---|---|
| | | (weight percent) | | | |
| 2 | 48.7 | 70.4 | 0.98 | | 8.1 |
| 3 | 52.5 | 58.4 | 0.96 | | 12.2 |
| 4 | 47.6 | 82.2 | 0.97 | | 4.3 |

Battery Cell Testing

An aliquot of the ceramic material was made into an electrode as described above and assembled into a test cell as described above. The results are summarized in Table 2.

TABLE 2

| Ex No | Pyrolysis Rate (°C./min) | Reversible Capacity (mAh/g) | Irreversible Capacity (mAh/g) | Avg Charge Voltage |
|---|---|---|---|---|
| | | Battery Testing | | |
| 2 | 5 | 510 | 260 | 1.00 |
| 3 | 5 | 560 | 320 | 1.13 |
| 4 | 5 | 450 | 210 | 0.91 |

That which is claimed is:

1. A method of forming an electrode material for a lithium ion battery comprising:
   (A) pyrolyzing a composition comprising a silazane polymer to form a ceramic material; and
   (B) introducing lithium ions into the ceramic material to form an electrode material.

2. The method of claim 1 wherein the composition comprising the silazane polymer is cured prior to pyrolysis.

3. The method of claim 1 wherein the composition comprising the silazane polymer is pyrolyzed at a temperature in the range of 700° to 1400° C. at a rate of heating less than about 10° C./minute.

4. The method of claim 1 wherein the ceramic material is formed into a powder, the powder blended with a binder and a diluent to form a mixture and the mixture formed into the desired shape of the electrode before the lithium ions are introduced.

5. The method of claim 1 wherein pyrolysis of the silazane polymer produces a ceramic material containing at least 0.5 weight percent excess carbon.

6. The method of claim 1 wherein the silazane polymer has a char yield greater than about 50 weight percent.

7. The method of claim 1 wherein the composition comprising the silazane polymer also contains a curing agent.

8. The method of claim 1 wherein the composition comprising the silazane polymer also contains a carbonaceous material.

9. The method of claim 1 wherein the composition comprising the silazane polymer also contains a filler.

10. The method of claim 1 wherein the silazane polymer is a copolymer with a polymer selected from the group consisting of silalkylenes, silarylenes, siloxanes, silanes, and organic polymers.

11. The method of claim 1 wherein the silazane polymer is blended with a polymer selected from the group consisting of silalkylenes, silarylenes, siloxanes, silanes, and organic polymers.

12. In a rechargeable lithium ion battery, the improvement comprising:
an anode which comprises a material formed by:
   (A) pyrolyzing a composition comprising a silazane polymer to produce a ceramic material; and
   (B) introducing lithium ions into the ceramic material to form an anode.

13. The battery of claim 12 wherein the silazane polymer is pyrolyzed at a temperature in the range of 700° to 1400° C. at a rate of heating less than about 10° C./minute to produce a ceramic material containing at least 0.5 weight percent excess carbon and a char yield greater than about 50 weight percent.

14. The battery of claim 13 wherein the composition comprising the silazane polymer also contains at least one material selected from the group consisting of silalkylenes, silarylenes, siloxanes, silanes, organic polymers, fillers, curing agents and carbonaceous materials.

15. The battery of claim 13 wherein the silazane polymer is copolymerized with a material selected from the group consisting of silalkylenes, silarylenes, siloxanes, silanes and organic polymers.

16. An electrode material for a lithium ion battery comprising a material of the structure:

$SiO_xC_yN_z$ wherein x=0 to 4, y=0 to 1000 and z=0 to 40 and wherein lithium ions are incorporated therein.

17. The electrode material of claim 16 wherein x=0.1 to 2.0, y=0.1 to 100, z=0.1 to 1.5 and wherein lithium ions are incorporated therein.

18. The electrode material of claim 16 in the form of an electrode for a lithium ion battery.

19. In a method of making a rechargeable lithium ion battery, the improvement comprising making an anode by a process comprising:
   (A) pyrolyzing a composition comprising a silazane polymer to produce a ceramic material; and
   (B) introducing lithium ions into the ceramic material to form an anode.

* * * * *